United States Patent
Mallory

(10) Patent No.: US 8,006,954 B2
(45) Date of Patent: Aug. 30, 2011

(54) ADJUSTABLE CABLE PULLER

(76) Inventor: Joseph Mallory, Annandale, VA (US)

( * ) Notice: Subject to any disclaimer, the term of this patent is extended or adjusted under 35 U.S.C. 154(b) by 598 days.

(21) Appl. No.: 11/603,180

(22) Filed: Nov. 22, 2006

(65) Prior Publication Data

US 2008/0116429 A1    May 22, 2008

(51) Int. Cl.
*H02G 1/08* (2006.01)
*B65H 59/00* (2006.01)
*E21C 29/16* (2006.01)

(52) U.S. Cl. ...... 254/134.3 FT; 254/134.3 R; 254/134.4

(58) Field of Classification Search ......... 254/134.3 FT, 254/134.3 R, 134.4
See application file for complete search history.

(56) References Cited

U.S. PATENT DOCUMENTS

| | | | | |
|---|---|---|---|---|
| 458,018 A | * | 8/1891 | Curtis | 452/189 |
| 643,558 A | * | 2/1900 | Tallet | 294/75 |
| 708,608 A | * | 9/1902 | Zander | 452/192 |
| 1,503,738 A | * | 8/1924 | Young | 452/191 |
| 1,975,194 A | * | 10/1934 | Courtney | 294/68.3 |
| 1,989,858 A | * | 2/1935 | Harrington | 294/68.22 |
| 2,093,732 A | * | 9/1937 | Pawlitschek | 452/191 |
| 2,198,107 A | * | 4/1940 | Dockstetter et al. | 223/88 |
| 2,275,704 A | * | 3/1942 | Turner, Sr. | 294/67.3 |
| 2,553,282 A | * | 5/1951 | Sokolik | 223/91 |
| 2,603,523 A | * | 7/1952 | Cameron | 294/74 |
| 2,622,540 A | * | 12/1952 | Stewart et al. | 414/800 |
| 2,780,487 A | * | 2/1957 | Bredensteiner et al. | 294/81.56 |
| 3,031,126 A | * | 4/1962 | Cornish | 229/117.17 |
| 3,583,750 A | * | 6/1971 | Norton | 294/74 |
| 3,701,558 A | * | 10/1972 | Baker | 294/33 |
| 3,741,449 A | * | 6/1973 | MacKenzie | 223/91 |
| 4,194,295 A | | 3/1980 | Simuro et al. | |
| D312,388 S | * | 11/1990 | Riener | D8/373 |
| 5,174,057 A | * | 12/1992 | Sienel | 43/5 |
| D333,991 S | | 3/1993 | Lee | |
| D345,780 S | * | 4/1994 | Ream | D22/199 |
| D363,339 S | * | 10/1995 | Rohacek | D22/199 |
| 5,591,077 A | * | 1/1997 | Rowe | 452/189 |
| 5,641,106 A | * | 6/1997 | Slaughter et al. | 224/324 |
| 5,713,538 A | * | 2/1998 | Gabriel | 244/118.1 |
| 5,735,728 A | * | 4/1998 | Nickerson | 449/1 |
| 5,860,769 A | * | 1/1999 | Seligman | 405/186 |
| 6,032,993 A | * | 3/2000 | Kwon | 294/1.1 |
| 6,068,166 A | * | 5/2000 | Kilian et al. | 223/94 |
| 6,193,217 B1 | | 2/2001 | Zimmer | |
| 6,283,450 B1 | * | 9/2001 | Viola | 254/134.3 R |
| 6,323,407 B1 | * | 11/2001 | May | 84/421 |
| 6,329,583 B1 | * | 12/2001 | May | 84/421 |
| D462,416 S | * | 9/2002 | Dallas, Sr. | D22/199 |
| D531,418 S | * | 11/2006 | Williams | D6/326 |
| 7,175,160 B2 | * | 2/2007 | Diggle et al. | 254/134.3 FT |
| 7,201,364 B2 | * | 4/2007 | Diggle et al. | 254/134.3 FT |
| 7,216,846 B2 | * | 5/2007 | Crawford | 254/134.3 FT |
| 2005/0284902 A1 | * | 12/2005 | Colesanti | 224/250 |

* cited by examiner

*Primary Examiner* — Lee D Wilson
*Assistant Examiner* — Alvin J Grant
(74) *Attorney, Agent, or Firm* — Reed Smith LLP

(57) ABSTRACT

A cable puller has a pair of shoulder bars connected to each other at one end thereof, each of the shoulder bars having a hook at the other end for releasably accommodating a plurality of wires or cables thereon; and a support bar with two ends respectively and symmetrically connected to respective intermediate points of the shoulder bats. The shoulder and support bars are arranged to provide a shoulder width wider than a depth of an enclosed space to pull the cable therethrough and narrower than a pre-determined pathway in the enclosed space the cables are designed to be pulled therealong.

16 Claims, 3 Drawing Sheets

ADJUSTABLE CABLE PULLER

BACKGROUND OF THE INVENTION

1. Field of the Invention

The present invention concerns cable pullers. More particularly, the invention is directed to an adjustable cable puller for accommodating cables while transferring the cable via a tray pre-installed in an enclosed space (including under floor ducts, cellular floors, conduits, raised floors, ceiling zones and cable trays) without tangling the cables.

2. Description of the Prior Art

Copper wires and optical fibers are widely used in utility transmission and communication to permit power or digital data transmission over long distances and at high data rates. Optical fibers are also used to form sensors, and in a variety of other applications. Multi-mode fibers are used mostly for short distances (up to 500 m), and single-mode fibers are used for longer distance links. In practical fibers, a cladding is usually coated with a tough resin buffer layer, which may be further surrounded by a jacket layer, usually plastic. These layers add strength to the fiber but do not contribute to its optical wave guide properties. For indoor applications, the jacketed fiber is generally enclosed, with a bundle of flexible fibrous polymer strength members, in a lightweight plastic cover to form a simple cable. Each end of the cable may be terminated with a specialized optical fiber connector to allow it to be easily connected and disconnected from transmitting and receiving equipment. Modern fiber cables can contain up to a thousand fibers in a single cable, so the performance of optical networks easily accommodates even today's demands for bandwidth on a point-to-point basis.

It is necessary to pull fiber optic cables via inner ducts in a ceiling or other spaces of a building. These are usually straight pulls (point A to point B). There are some commercially available fiberglass wire pulling rods which are used to fish cables through walls and floors, over suspended ceiling grid and into many other hard to reach areas. The fiberglass rods have a degree of flex which allows for bending through wall outlet holes and stud holes. Once the rod hooks the cables, the user pulls the cables across the enclosed space.

However, if the space was left with a drag line therein when the building was being constructed, a person can find the drag line, tire the drag line to a plurality of cables, then to pull the other end of the drag line from another side of the enclosed space to pull the cables via the enclosed space. The process becomes easies if there is another person feeding the cables from the first side of the enclosed space. When considering directly attaching the drag line to the cables, loose fiberglass threads are not suitable for direct attachment because they may break if knotted. Fiberglass epoxy rods are too rigid to tie, but may be secured to the pulling fixture by using tight clamping plates or screws.

More modern buildings are installed with air plenums, trays, or raceways. For example, some cable trays are manufactured in a 2"×2" grid pattern with 0.120 inch wire diameter. The smaller grid helps to prevent cable sagging or dropping when used in fiber optic applications. These trays are available in widths of 2", 4", 6", 8", and 10" and depths of 2" and 4". The available lengths are 1, 2, 5, 8, and 10 feet. Others come with a grid pattern of 2"×4" and are available in standard widths of 6", 8", 12", 18" and 24". Lengths can be ordered in 1', 2', 5', 8' and 10' with a depth/height of either 2" or 4". Diagonal pulling across an area or pulling around a corner used to require professional skills to install the cable at an angle. However, tray junctions make changing routing directions easy. Each type tray junction is available in 2 or 4 inch deep trays and 6, 8, 12, 18 and 24 inch widths. U.S. Pat. No. 6,193,217 describes a cable puller to work with such trays.

The product marked with U.S. Pat. No. 6,193,217 and carried by Zimmer's Communication Inc. were no longer available in the market. The product has a fixed size of 13 ½" long and 5" wide at the rear end. Due to its narrow rear end, the product turned easily in the tray so as to twist and damages the cables. In addition, Zimmer's fingers take time and effort to insert cables one after one therebetween in the cable puller.

There is a need for a better cable puller for the industry.

SUMMARY OF THE INVENTION

It is a major object of the invention to provide a cable puller moving cables via trays without twisting the cables with one another.

It is another object of the invention to provide a cable puller easy to use and adjustable with existing cable trays.

It is another object of the invention to provide a cable puller adaptable to existing cable trays of different sizes.

Finally, it is a general goal of the invention to provide improved elements and arrangements thereof in a cable puller for the purposes described which is dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered with the accompanying drawings, in which like reference characters designate the same or similar parts throughout the several views, and wherein.

DETAILED DESCRIPTION OF THE PREFERRED EMBODIMENTS

Figure 1:
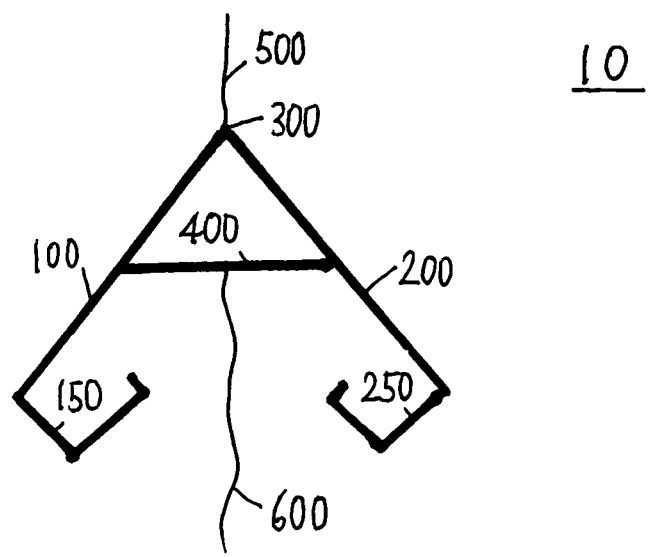
FIG. 1 shows a plan view of a first embodiment of a cable puller according the present invention.

Referring now to FIG. 1, the cable puller of the present invention is generally boomerang-shaped as indicated by the numeral 10. It can be seen that the cable puller 10 is comprised of a pair of shoulder bars 100, 200 connected at a connecting point 300 with a respective end of the bars and separated by a support bar 400 with two ends connected to an intermediate points on the pars respectively to keep a clean follow line. A pulling line 500 is attached to the connecting point 300, and a follow (feeding) line 600 is attached to the center of the support bar 400. Each of the shoulder bars 100, 200 has a hook 150, 250 respectively for accommodating and carrying a plurality of cables 60 (FIG. 5) therein.

Figures 2A, 2B, 2C:
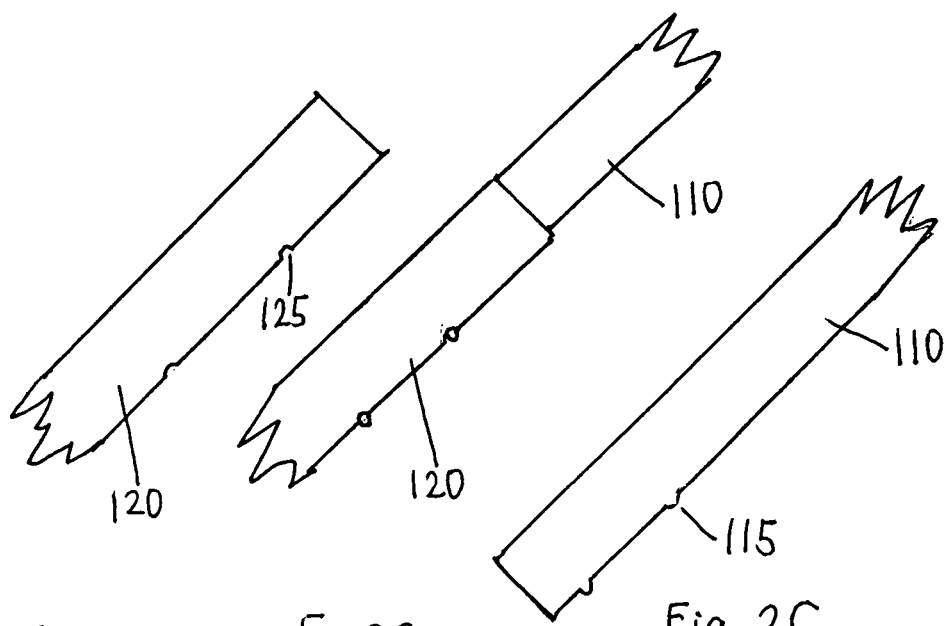
FIG. 2A shows an outer bar of the shoulder bars of the cable puller in FIG. 1.
FIG. 2C shows an inner bar of the shoulder bars of the cable puller in FIG. 1.
FIG. 2B shows that the outer bar and the inner bar telescorpedly engage with each other.
Figure 3:
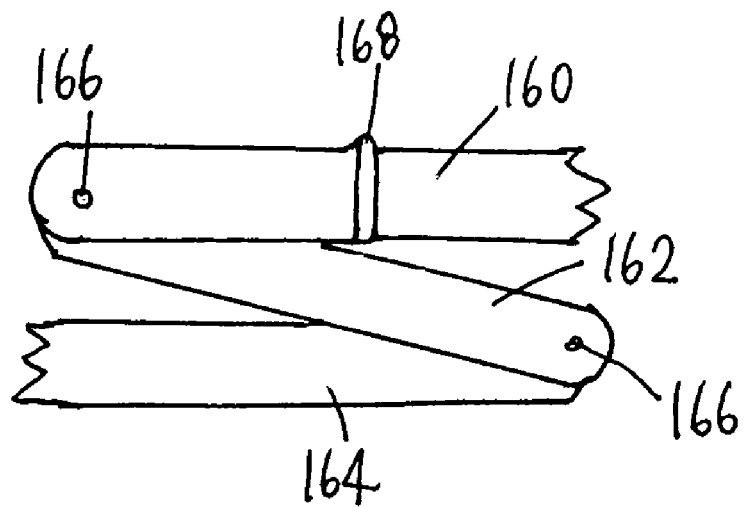
FIG. 3 shows a second embodiment of the shoulder bars each having a plurality of folding sections foldably engage with one another by pivotally moveable connects.
Figure 4:
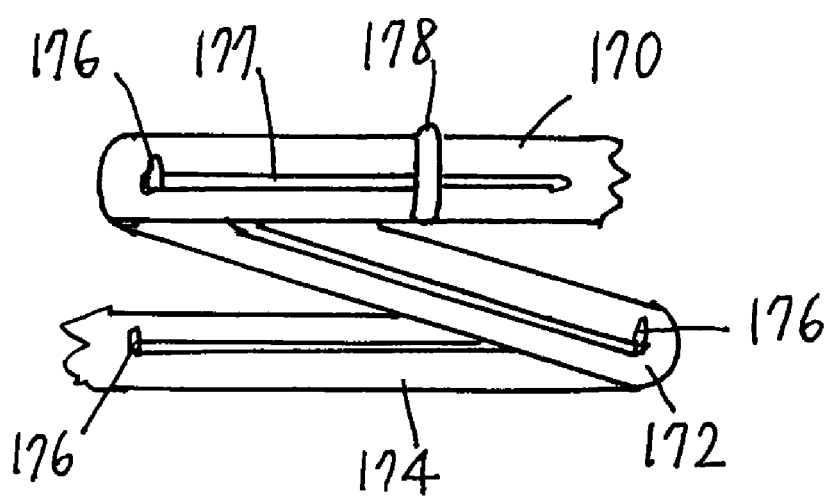
FIG. 4 shows a third embodiment of the shoulder bars each having with a sliding pin and a longitudinal slot.

The shoulder bars 100, 200 can be variable in length to adjust it shoulder width to adapt to tray 50 (FIG. 5) of different widths by adjusting the interlocking means thereof. In one embodiment, the shoulder bar 100 has one inner bar 110 (FIG. 2C) telescorpedly engages with an outer bar 120 (FIG. 2A) and their combined length is determined by protrusions 115 of the inner bar 110 interlocked with the accommodating holes 125 on the outer bar 120 (FIG. 2B). In another embodiment, the shoulder bar 100 has a plurality of folding sections 160, 162, 164 foldably engage with one another like the sections of a typical folding ruler connected by pivotally moveable connects 166 (FIG. 3) or the one described in U.S. Pat. No. 4,194,295 with sections 170, 172, 176 each has an elongated body with a sliding pin 176 and a longitudinal slot 177 (FIG. 4). A fixing means 168 or 178, such as a clip or a clamp, is attached to the shoulder bar to fix the length.

Figure 5:
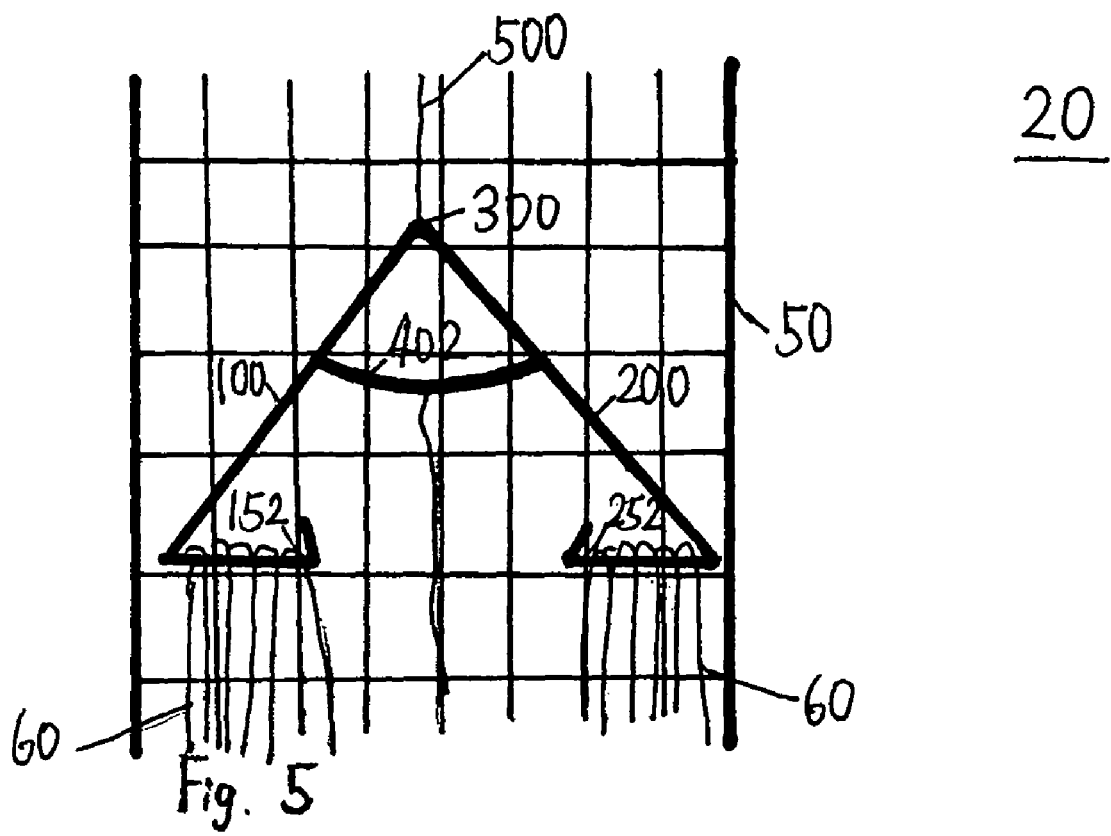
FIG. 5 shows a plan view of a second embodiment of a cable puller carrying cables via a tray according the present invention.
Figure 6:
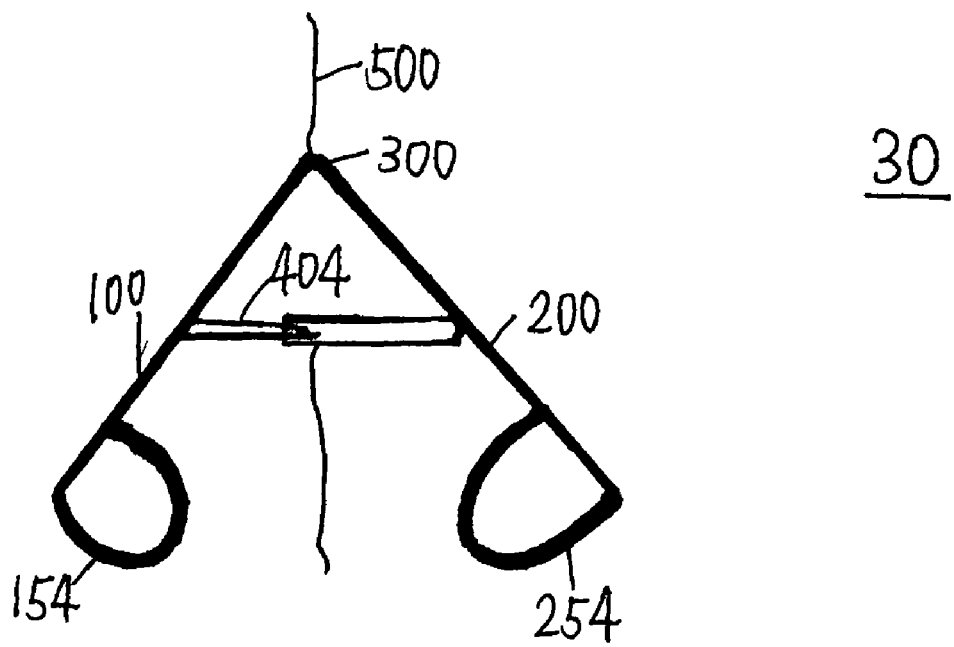
FIG. 6 shows a plan view of a third embodiment of a cable puller according the present invention.

Another way to adjust the shoulder width of the cable puller 10 is to adjust the length of the support bar 400, while leaves the shoulder bars 100, 200 pivotally connected at the connection point 300. The length of the support bar 400 can be adjusted according to the same methods as the shoulder bars described above based upon similar embodiments depicted in FIGS. 2-4. Alternatively, the support bar 400 is substituted by a swivel 402 (FIG. 5) or an adjustable spring or cylinder 404 (FIG. 6). A common design for a swivel is a cylindrical rod that can turn freely within a support structure. The rod is usually prevented from slipping out by a nut, washer or thickening of the rod. The swivel 402 is attached to the shoulder bars 100, 200. Another common design is a hollow cylindrical rod that has a rod that is slightly smaller than its inside diameter inside of it. They are prevented from coming apart by flanges. Air cylinders are pneumatic linear actuators that are driven by a pressure differential in the cylinder's chambers. They may be single-acting (with a spring return) or double-acting.

The L-shaped hooks 150, 250 can be modified into all kinds of shapes or forms as long as they can carry the cables 60. For example, FIG. 5 shows hooks 152, 252 with a J-shape, and FIG. 6 shows hooks 154, 254 of a loop-shape.

In another embodiment of the invention, at least one of the connecting point 300 and the support bar 400 is form with a loop to insert a line therethrough.

The cable puller 10 is pulled as follows. First of all, to place a bundle of cables 60 into at least one of the hook of the cable puller 10. Second, to tire an existing drag line left in the enclosed space to the connecting point 300, and to tire a fellow line to the support bar 400. Third, place the cable puller 10 into one end of the tray 50 (FIG. 5). Fourth, to pull the drag line from the other side of the tray so as to pull the cables 60 through the tray without tangling or damaging the cables 60. Fifth, to cut the fellow line off the cable puller and leave it in the enclosed space for executing a future pulling process.

The cable puller 10 can be made of metal, plastic or other sturdy materials to carry the weight of the cables. For example, to carry a bundle of (e.g., thirty) 12-strand cables on each side, the cable puller 10 is made of metal with shoulder bars of ½" wide and 11½" long (which can be extended to 15¾" long), and the support bar of ¾" wide and 6½" long (which can be extended to 9½" long). The cable puller 10 works either by itself in an enclosed space, or with air plenums, trays, raceways, or other predetermined pathways. Trays are used as an example in this application.

Before the pulling process, a user should ensure the shoulder width of the cable puller 10 to be smaller the width of the tray so as to be pulled therethrough without being stuck, to be bigger than the depth of the tray and the space above the tray to prevent the cable puller 10 from twisting during the pulling process. If not, the user should adjust the shoulder width of the cable puller 10 by adjusting the lengths of the shoulder bars 100, 200, by adjust the length of the supporting bar 400, or adjusting both. For example, to travel along a tray of 12" wide and 4" deep, the shoulder width of the cable puller 10 is adjusted to be in the range between 4" and 12", and preferably about 11½" to leave ½" for moving space at the side and keep the cable puller 10 laid flat on the tray surface as much as possible. However, when travel along a tray of 16" wide and 4" deep, the user should adjust the shoulder width of the cable puller 10 is adjusted to be in the range between 4" and 16", and preferably about 15¾".

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

I claim:

1. A cable puller, comprising:
    a pair of shoulder bars connected to each other at one end thereof, each of the shoulder bars having a hook at the other end for releasably accommodating a plurality of wires or cables thereon; and
    a support bar with two ends respectively and symmetrically connected to respective intermediate points of the shoulder bars, each of the intermediate points of the shoulder bars being located between the one end and the other end of its respective shoulder bar;
    wherein the shoulder and support bars are arranged to provide a shoulder width wider than a depth of an enclosed space to pull the cable therethrough and narrower than a pre-determined pathway in the enclosed space the cables are designed to be pulled therealong; and
    wherein a pulling line is attached to the connecting point of the shoulder bars, and a follow line is attached to the center of the support bar.

2. The cable puller according to claim 1,
    wherein the pair of shoulder bars are connected to each other at a fixed angle.

3. The cable puller according to claim 1;
    wherein the pre-determined pathway is an air plenum, a tray, or a raceway.

4. A cable puller, comprising:
    a pair of shoulder bars connected to each other at one end thereof, each of the shoulder bars having a hook at the other end for releasably accommodating a plurality of wires or cables thereon; and
    a support bar with two ends respectively and symmetrically connected to respective intermediate points of the shoulder bars, each of the intermediate points of the shoulder bars being located between the one end and the other end of its respective shoulder bar;

wherein at least one of the support bar and the pair of shoulder bars is adjustable in length so as to provide a shoulder width wider than a depth of an enclosed space to pull the cable therethrough and narrower than a pre-determined pathway in the enclosed space the cables are designed to be pulled therealong; and a pulling line is attached to the connecting point of the shoulder bars, and a follow line is attached to the center of the support bar.

5. The cable puller according to claim 4;

wherein the pair of shoulder bars are connected to each other at a fixed angle.

6. The cable puller according to claim 4;

wherein the pair of shoulder bars are pivotally connected to each other at an adjustable angle.

7. The cable puller according to claim 6;

wherein the support bar is variable in length.

8. The cable puller according to claim 6;

wherein the support bar is a swivel, or an adjustable spring, or an adjustable cylinder.

9. The cable puller according to claim 4;

wherein the pre-determined pathway is an air plenum, a tray, or a raceway.

10. The cable puller according to claim 4;

wherein at least one of a connecting point of the shoulder bars and the support bar is formed with a loop to insert a wire therethrough.

11. The cable puller according to claim 4;

wherein the shoulder bars are variable in length by adjusting interlocking means thereof.

12. The cable puller according to claim 11;

wherein each of the shoulder bars has one inner bar telescopedly engages with an outer bar to provide the shoulder width.

13. The cable puller according to claim 12;

wherein the shoulder width is determined by protrusions of the inner bar interlocked with accommodating holes on the outer bar.

14. The cable puller according to claim 12;

wherein each of the shoulder bar has a plurality of folding sections foldably engaged with one another by pivotally moveable connects.

15. The cable puller according to claim 14;

wherein each of the folding sections has an elongated body with a sliding pin and a longitudinal slot.

16. The cable puller according to claim 12;

wherein at least a pair of clips or a clamps are attached to the shoulder bars respectively to fix the shoulder length.

* * * * *